(12) United States Patent
Van Buren et al.

(10) Patent No.: US 10,155,577 B1
(45) Date of Patent: Dec. 18, 2018

(54) METHOD AND SYSTEM FOR CONTROLLING A MARINE DRIVE DURING PANIC SHIFT

(71) Applicant: Brunswick Corporation, Lake Forest, IL (US)

(72) Inventors: David M. Van Buren, Fond du Lac, WI (US); Travis C. Malouf, Oconomowoc, WI (US); Robert Raymond Osthelder, Omro, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/662,970

(22) Filed: Jul. 28, 2017

(51) Int. Cl.
| | | |
|---|---|---|
| *B63H 21/21* | (2006.01) | |
| *B63H 20/10* | (2006.01) | |
| *F02D 29/02* | (2006.01) | |
| *F02D 9/08* | (2006.01) | |
| *G01C 21/20* | (2006.01) | |

(52) U.S. Cl.
CPC ............ *B63H 21/21* (2013.01); *B63H 20/10* (2013.01); *F02D 9/08* (2013.01); *F02D 29/02* (2013.01); *G01C 21/203* (2013.01); *B63H 2021/216* (2013.01)

(58) Field of Classification Search
CPC ............ B63H 21/21; B63H 20/10; F02D 9/08
See application file for complete search history.

(56) References Cited

U.S. PATENT DOCUMENTS

| | | | |
|---|---|---|---|
| 4,257,506 A | 3/1981 | Bankstahl | |
| 4,753,618 A | 6/1988 | Entringer | |
| 4,794,820 A | 1/1989 | Floeter | |
| 4,952,181 A | 8/1990 | Entringer et al. | |
| 5,828,974 A * | 10/1998 | Hawarden | F16H 61/0246 701/64 |
| 6,015,365 A * | 1/2000 | Kolb | B60W 10/06 477/101 |
| 6,692,320 B1 | 2/2004 | Sawyer | |
| 6,733,352 B1 * | 5/2004 | Belter | F01P 7/167 440/1 |
| 6,755,703 B1 | 6/2004 | Erickson | |
| 6,757,606 B1 * | 6/2004 | Gonring | F02D 41/2422 123/406.23 |
| 6,942,530 B1 * | 9/2005 | Hall | B63H 21/213 440/1 |
| 7,568,404 B2 | 8/2009 | Rossman et al. | |

(Continued)

OTHER PUBLICATIONS

Belter et al., "Lockout for Remote Controls on Marine Vessels", Unpublished U.S. Appl. No. 14/992,513, filed Jan. 11, 2016.

(Continued)

*Primary Examiner* — S. Joseph Morano
*Assistant Examiner* — Jovon E Hayes
(74) *Attorney, Agent, or Firm* — Andrus Intellectual Property Law LLP (57) ABSTRACT

A method for controlling a marine engine system includes receiving an operator demand to change an engine speed of the marine engine system, and then detecting a panic shift command based on the operator demand. A minimum speed demand value and hold period are then determined. A speed command to the marine engine system is set at or above the minimum speed demand value for at the least the hold period following detection of the panic shift command.

20 Claims, 8 Drawing Sheets

(56) References Cited

U.S. PATENT DOCUMENTS

| | | | |
|---|---|---|---|
| 8,439,800 B1* | 5/2013 | Bazan | F16H 61/0246 |
| | | | 477/180 |
| 8,961,246 B1* | 2/2015 | Kirchhoff | B63H 21/21 |
| | | | 440/1 |
| 9,043,058 B1* | 5/2015 | Camp | B63H 23/02 |
| | | | 701/21 |
| 9,103,287 B1* | 8/2015 | Arbuckle | F02D 41/22 |
| 9,156,537 B1* | 10/2015 | Nakayasu | B63H 25/06 |
| 9,272,764 B2* | 3/2016 | Bamba | B63H 21/213 |
| 9,828,080 B1* | 11/2017 | Belter | B63H 21/213 |
| 10,059,417 B1* | 8/2018 | Hilbert | B63H 21/14 |
| 2004/0226801 A1 | 11/2004 | De Jonge et al. | |
| 2018/0043980 A1* | 2/2018 | Przybyl | B63H 21/213 |

OTHER PUBLICATIONS

Anschuetz et al., "Method and Control System for Controlling a Marine Internal Combustion Engine", Unpublished U.S. Appl. No. 15/597,798, filed May 17, 2017.

* cited by examiner

METHOD AND SYSTEM FOR CONTROLLING A MARINE DRIVE DURING PANIC SHIFT

FIELD

The present disclosure relates to methods and systems for controlling a marine drive, and more specifically to control methods and systems that prevent a marine drive from stalling during a panic shift command.

BACKGROUND

The following U.S. patents and publications are hereby incorporated by reference herein.

U.S. Pat. No. 4,257,506 discloses a male cone member of a cone clutch mechanism that has two springs, each encircling cam faces on the male cone member and bearing against the forward and reverse clutch gears, respectively, to bias the cone member away from its center or neutral position toward either the forward or reverse clutch gear. An eccentric roller on the shift actuator shaft engages with a circumferential groove in the male cone member to provide a vibrating force against the member for shifting. The shift means uses a cam and bell crank mechanism to convert axial movement of the shift controller to rotary movement of the actuator shaft.

U.S. Pat. No. 4,753,618 discloses a shift cable assembly for a marine drive that includes a shift plate, a shift lever pivotally mounted on the plate, and a switch actuating arm pivotally mounted on the plate between a first neutral position and a second switch actuating position. A control cable and drive cable interconnect the shift lever and switching actuating arm with a remote control and clutch and gear assembly for the marine drive so that shifting of the remote control by a boat operator moves the cables to pivot the shift lever and switch actuating arm which in turn actuates a shift interrupter switch mounted on the plate to momentarily interrupt ignition of the drive unit to permit easier shifting into forward, neutral and reverse gears. A spring biases the arm into its neutral position and the arm includes an improved mounting for retaining the spring in its proper location on the arm.

U.S. Pat. No. 4,952,181 discloses a shift cable assembly for a marine drive having a clutch and gear assembly that includes a remote control for selectively positioning the clutch and gear assembly into forward, neutral and reverse, a control cable connecting the remote control to a shift lever pivotally mounted on a shift plate, a drive cable connecting the shift lever on the shift plate to the clutch and gear assembly, and a spring guide assembly with compression springs biased to a loaded condition by movement of the remote control from neutral to forward and also biased to a loaded condition by movement of the remote control from neutral to reverse. The bias minimizes chatter of the clutch and gear assembly upon shifting into gear, and aids shifting out of gear and minimizes slow shifting out of gear and returns the remote control to neutral, all with minimum backlash of the cables. The spring guide assembly includes an outer tube mounted to the shift plate, and a spring biased plunger axially reciprocal in the outer tube and mounted at its outer end to the shift lever.

U.S. Pat. No. 6,015,365 discloses a shift-assist circuit for reducing the clutch wear of a transmission on a marine propulsion system during the shift process by anticipating the probable shifting forces and providing an ignition-kill signal before the shift forces can build to an unacceptable level.

U.S. Pat. No. 8,439,800 discloses a shift control system for a marine drive applies partial clutch engagement pressure upon initial shifting from forward to reverse to prevent stalling of the engine otherwise caused by applying full clutch engagement pressure upon shifting from forward to reverse.

U.S. Pat. No. 8,961,246 discloses systems and methods for controlling shift in a marine propulsion device. A shift sensor outputs a position signal representing a current position of a shift linkage. A control circuit is programmed to identify an impending shift change when the position signal reaches a first threshold and an actual shift change when the position signal reaches a second threshold. The control circuit is programmed to enact a shift interrupt control strategy that facilitates the actual shift change when the position signal reaches the first threshold, and to actively modify the first threshold as a change in operation of the marine propulsion device occurs.

U.S. Pat. No. 9,043,058 discloses methods and systems for facilitating shift changes in a marine propulsion device having an internal combustion engine and a shift linkage that operatively connects a shift control lever to a transmission for effecting shift changes amongst a reverse gear, a neutral position and a forward gear. A position sensor senses position of the shift linkage. A speed sensor senses speed of the engine. A control circuit compares the speed of the engine to a stored engine speed and modifies, based upon the position of the shift linkage when the speed of the engine reaches the stored engine speed, a neutral state threshold that determines when the control circuit ceases reducing the speed of the engine to facilitate a shift change.

U.S. Pat. No. 9,103,287 discloses drive-by-wire control systems and methods for a marine engine that utilize an input device that is manually positionable to provide operator inputs to an engine control unit (ECU) located with the marine engine. The ECU has a main processor that receives the inputs and controls speed of the marine engine based upon the inputs and a watchdog processor that receives the inputs and monitors operations of the main processor based upon the inputs. The operations of the main processor are communicated to the watchdog processor via a communication link. The main processor causes the watchdog processor to sample the inputs from the input device at the same time as the main processor via a sampling link that is separate and distinct from the communication link. The main processor periodically compares samples of the inputs that are simultaneously taken by the main processor and watchdog processor and limits the speed of the engine when the samples differ from each other by more than a predetermined amount.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method for controlling a marine engine system includes receiving an operator demand to change an engine speed of the marine engine system, and then detecting a panic shift command based on the operator demand. A minimum speed demand value and hold period are then determined. A speed command to the marine engine system is set at or above the minimum speed demand value for at the least the hold period following detection of the panic shift command.

One embodiment of a marine propulsion system includes a marine engine system, a remote control for controlling propulsion of a marine vessel by the marine engine system, and a control module. The control module is configured to receive an operator demand based on a lever position of the remote control to change the engine speed of the marine engine system, and then to detect a panic shift command based on the operator demand. A minimum engine speed and hold period are then determined. A speed command to the marine engine is set at or above the minimum speed demand value for at least the hold period following detection of the panic shift command.

BRIEF DESCRIPTION OF THE DRAWINGS

The present disclosure is described with reference to the following FIGURES.

DETAILED DESCRIPTION

One common design requirement for marine drives is that the engine of the marine drive must not stall when rapidly shifted from a specified engine revolutions per minute (RPM) in forward gear to wide open throttle (WOT) reverse, often referred to as "a panic shift" event. Control strategies have been developed for dealing with panic shift events, which involves strategic control of air, fuel, and spark provided to the cylinders in order to prevent stalling. However, the inventors have recognized that certain control scenarios and/or arrangements do not permit the ability to adjust fueling, air flow, and/or spark. Accordingly, the inventors have further recognized a need for a control strategy to avoid engine stall during a panic shift event where there is no direct control over the combustion factors and where the only controllable variable is commanded engine speed. For example, such a scenario exists where an engine and engine control module are provided by one manufacturer, and steering and propulsion control systems are provided by another—e.g., where a control system (such as housed on a System Integration Module (SIM)) provides torque speed control, or engine speed control, commands to the engine control module of the engine, but does not provide any combustion controls thereto.

Accordingly, the inventors have developed a control system and method wherein, upon detecting a panic shift command, the system determines a minimum speed demand value and a hold period, and then sends a control signal to maintain the engine speed of the marine drive above the minimum speed demand value for at least the hold period.

For example, the minimum speed demand value and/or the hold period may be determined based on current engine speed at the time of, or immediately after, detecting the panic shift command. The minimum speed demand values may be offset amounts above a minimum RPM for the engine, such as above the idle speed set point for the engine. Thereby, the control strategy effectively maintains a temporary elevated idle speed, which gives the engine additional time to apply as much torque as possible to prevent the engine from stalling.

While the increased engine speed may prevent stalling, the inventors further recognized that stall prevention should be balanced against the likelihood of causing damage to the marine drive by shifting into reverse gear at high engine speeds. Accordingly, the minimum speed demand value may be a carefully calibrated value to provide a sufficiently high engine speed and hold period in order to provide adequate stall prevention performance, without being overly high as to unnecessarily risk damaging the shift system or the powertrain.

Figure 1:
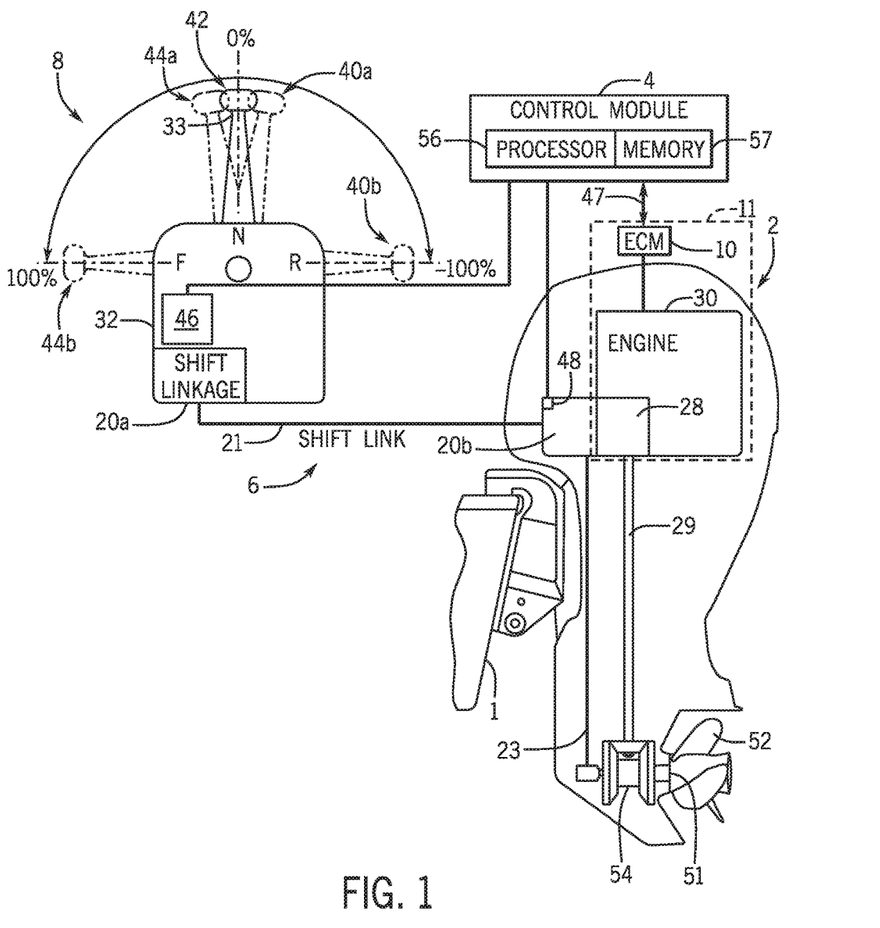
FIG. 1 schematically depicts a propulsion control system according to one embodiment of the disclosure.

FIG. 1 depicts an exemplary propulsion control system 6 for a marine drive 2 on a marine vessel 1. In the examples shown and described, the marine drive 2 is an outboard motor; however, the concepts of the present disclosure are not limited for use with outboard motors and can be implemented with other types of marine drives, such as inboard motors, inboard/outboard motors, hybrid electric marine propulsion systems, pod drives, and/or the like. In the examples shown and described, the marine drive 2 has a marine engine 30 causing rotation of a drive shaft 29 to thereby cause rotation of a propeller shaft 51. A propeller 52 connected to and rotating with the propeller shaft 51 propels the marine vessel 1 to which the marine drive 2 is connected. The direction of rotation of the propeller shaft 51 and propeller 52 is changeable by a shift system, or gear system. In the example shown, the shift system includes a clutch 54, and more specifically a conventional dog clutch. The clutch 54 is actuated between a forward gear, a neutral state, and a reverse gear by a shift rod 23. In the neutral state, the clutch is in a position between the forward and neutral gears but is not engaged with either gear, and thus no power is transmitted from the marine engine 30 to the propeller shaft 51. Other types of clutches may equally be employed. In certain embodiments, the shift system may include a transmission which may control the rotational connection between the drive shaft 29 and the propeller shaft 51.

The propulsion control system 6 also includes a remote control 8 having a base 32 and a control lever 33 extending therefrom. In the example of FIG. 1, the remote control 8 is a combination shift/throttle controller with control lever 33 pivotally movable between a range of reverse positions 40 between a reverse detent position (zero throttle) 40a and a reverse wide open throttle position 40b, a neutral position 42, and a range of forward positions 44 between a forward detent position (zero throttle) 44a and a forward wide open throttle position 44b, as is conventional. The remote control 8 is typically located at the helm of the marine vessel 1. For example, the remote control 8 may be a console-mount remote control.

The propulsion control system 6 also includes a control module 4 that is programmable and includes a processor 56, such as a microprocessor, and memory 57. The control module 4 can be located anywhere with respect to other components of the propulsion control system 6 and/or located anywhere on the marine vessel 1 and can communicate with various components on the marine vessel 1 via wired and/or wireless links, as will be explained herein below. Although FIG. 1 shows a single control module 4, the propulsion control system 6 can include more than one control module 4, or control circuit. For example, the propulsion control system 6 may have a control module 4 located at or near the control lever 33 and can also have a control module 4 located at or near the marine drive 2. Each control module 4 can have one or more control functions and may cooperate, and one having ordinary skill in the relevant art will recognize that the control module 4 may have many different forms and is not limited to the example that is shown and described. For example, the control module 4 may comprise a microprocessor and other circuitry that retrieves and executes software from memory 57. A person having ordinary skill in the relevant art will understand in light of the present disclosure that the control module 4 can be implemented with a single processing device or may be distributed across multiple processing devices or sub-systems that cooperate to execute the control methods described herein. The memory 57 may comprise any storage media, or group of storage media, readable by the processor 56, which may be any processing device, or combination of processing devices. For example, the memory 57 may include volatile and/or non-volatile, removable and/or non-removable media implemented in any method or technology for storage of information, such as computer-readable instructions, data structures, program modules, or other data. Memory 57 may be implemented as a single storage device, or may be implemented across multiple storage devices or sub-systems. The processor 56 may be, for example, a general purpose central processing unit, an application specific processor, a logic device, or any other type of processing device or combination thereof.

In the depicted example, the control module 4 communicates with the marine engine system 11, which in the depicted embodiment includes the marine engine 30 and associated engine control module (ECM) 10 for the marine drive 2. In one embodiment, the marine engine system 11 may be a diesel system having a diesel engine 30 and a diesel engine controller 10. In other embodiments, the marine engine system 11 may include a gasoline engine 30 and the ECM 10 a gas engine controller.

User control of the output of the marine engine 30 is provided through the control module 4 to the ECM 10. In certain embodiments, communication between the control module 4 and the ECM 10 of the marine engine system 11 may be a two-way communication via the control link 47, wherein the ECM 10 may communicate various engine control values and/or sensed engine values to the control module 4. For example, the ECM 10 may communicate a current engine speed for the marine engine 30 to the control module 4. The control link 47 may be a wired link, or may be a wireless communication link between wireless receiver/transmitters employing any known wireless communication protocol. In one example, the control link 47 is a controller area network (CAN) bus, but other types of digital or analog communication links could be used. It should be noted that the communication link lines depicted in FIG. 1 are meant only to demonstrate that the various system elements are capable of communicating with one another, and do not represent actual wiring connections between the various elements, nor do they represent the only paths of communication between the elements. Additionally, the system 6 may incorporate various types of communication devices and system, and thus illustrated communication links, including the control link 47, may in fact represent various different types of wireless and/or wired data communication systems.

Figure 2:
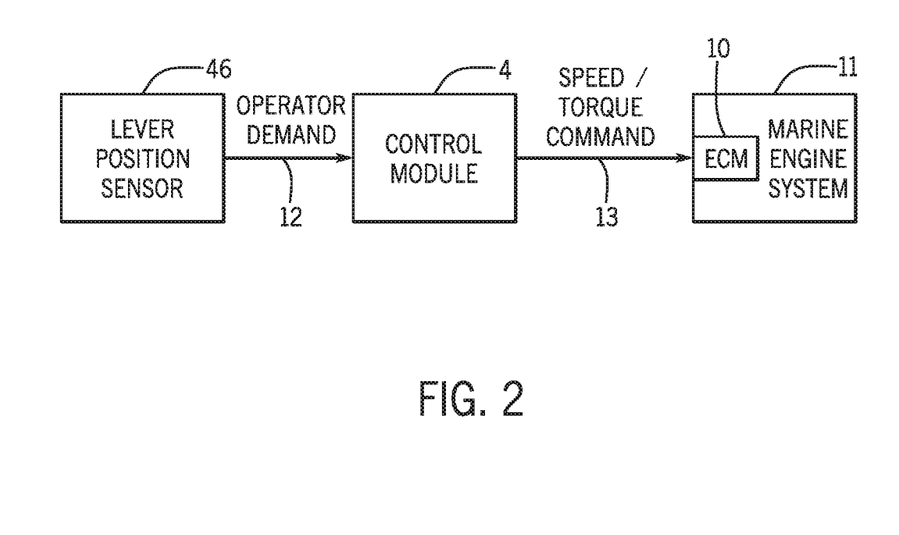
FIG. 2 is a schematic depiction of a control arrangement translating commands from a remote control to a marine engine system according to an embodiment of the disclosure.

FIG. 2 schematically depicts an exemplary embodiment of a control arrangement having a control module 4 communicating commands to a marine engine system 11. The user provides control inputs to the system 6 by moving the control lever 33 of the remote control 8. The position of the control lever 33 is sensed by the lever position sensor 46. The position sensor 46 may be placed anywhere on the control lever 33 and/or the base 32 in order to sense the rotational position of the control lever 33, which may vary between the reverse wide open throttle position 40b and the forward wide open throttle position 44b. The rotational position of the control lever 33 may be sensed at a predetermined interval by the position sensor 46 such that a rate of change of the position of the control lever 33 may be easily determined. The position sensor 46 may be an angular position sensor, and may provide an analog output or digital output of position of the controller. For example, the position sensor 46 may be a programmable magnetic encoder, a clinometer, a Hall Effect sensor, a potentiometer, a rotary encoder, or the like. To provide just one example, the position sensor 46 may be part no. 881070 by Mercury Marine of Fond du Lac, Wis.

The lever position sensor 46 senses the rotational position of the control lever 33 and provides the rotational position as an operator demand 12 to the control module 4. The operator demand 12 may be a lever position or an engine speed value correlating thereto. For example, the operator demand 12 may be a rotational position of the control lever 33 (such as a percentage of the maximum lever position in the particular direction), which may correlate to a demanded engine speed and/or engine torque. Upon receipt of the operator demand 12, the control module 4 outputs an engine speed and/or torque command value to the ECM 10, which is the engine speed and/or torque demanded based on the user input.

Upon detection of a panic shift, the disclosed control algorithm is invoked in order to reduce the likelihood that the engine 30 will stall. A minimum speed demand value 14 is calculated to provide a minimum engine speed for the marine engine 30 that is above the typical idle setpoint, or idle speed (see FIG. 4). The minimum speed demand value 14 is calculated to reduce the likelihood of engine stall when shifting to reverse given the current engine speed and conditions and the operator demand 12 from the user command. A hold period 70 is also determined, which is the period for which the minimum speed demand value 14 should be maintained in order to reduce the likelihood of engine stall. The control module 4 provides the minimum speed demand value 14 to the marine engine system 11 such that the ECM 10 controls the marine engine 30 accordingly. For example, the control module 4 may provide the minimum speed demand value 14 to the ECM 10 for the hold period. Alternatively, the control module 4 may provide the minimum speed demand value 14 and the hold period 70 to the ECM 10, which then controls the marine engine 30 accordingly for the hold period 70.

Figure 3:
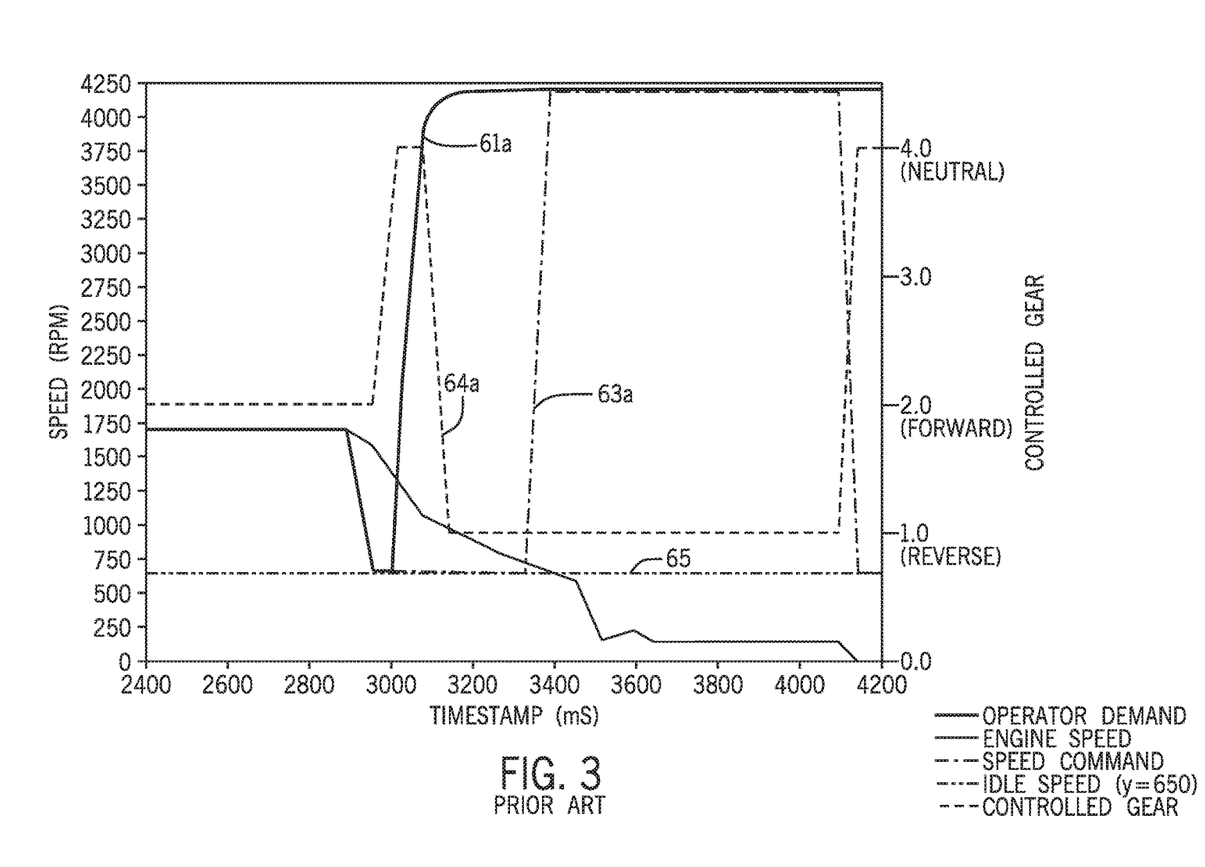
FIG. 3 depicts an exemplary engine and control function during a panic shift event utilizing a prior art control function.
Figure 4:
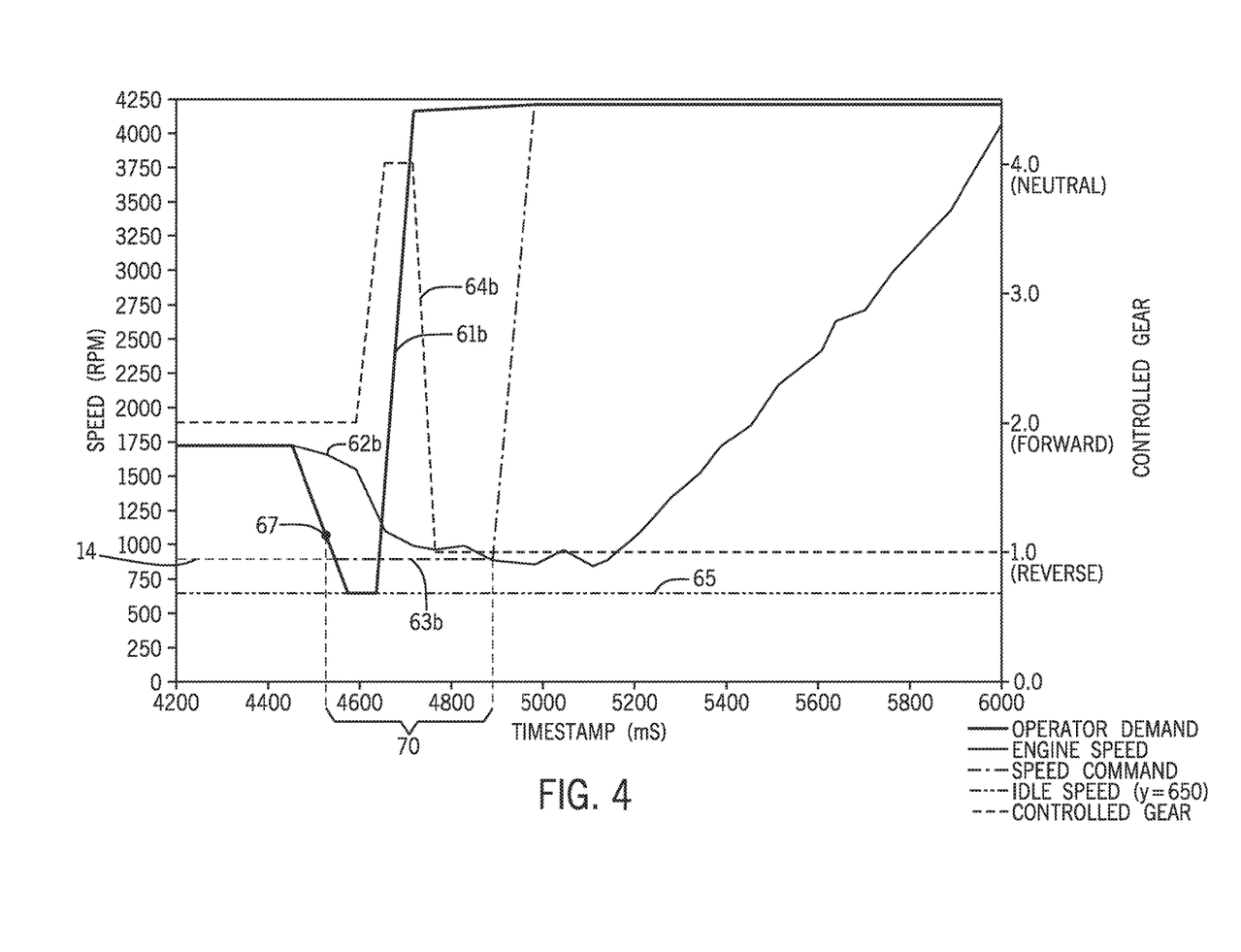
FIG. 4 depicts an exemplary scenario showing engine and control function during a panic shift event utilizing an embodiment of the disclosed control system and method.

By controlling the marine engine system 11 to maintain the engine speed of the marine engine 30 at or above the minimum speed demand value for at least the hold period, the control strategy significantly reduces the likelihood of stalling the engine when trying to carry out a panic shift command. The graphs at FIGS. 3 and 4 provide an exemplary illustration of this control strategy during a panic shift command. FIG. 3 depicts a panic shift scenario implementing a prior art control strategy, and FIG. 4 depicts a panic shift scenario implementing the disclosed control strategy. In the scenario of FIG. 3, the engine stalls after a panic shift command, whereas the engine does not stall in the scenario represented in FIG. 4 implementing the disclosed control strategy.

In FIG. 3, the panic shift command is detected based on the operator demand, represented by line 61a. As described herein, the panic shift command may be detected based on a change in lever position, such as a change in lever position over time and/or a difference between a current lever position and a filtered lever position value. With reference to the figures, the panic shift command is detected when the operator demand line 61a drops sharply from a steady demand of about 1,700 RPM to neutral, or idle, and then quickly shifts to reverse and demands a high engine RPM of over 4,000 RPM in reverse. The panic shift command may be detected based on the rapid change in operator demand and/or based on the rapid shift from forward to reverse combined with the sudden high RPM demand in reverse.

As shown in FIG. 3, prior art systems stall in trying to execute such panic shifts to reverse. The engine speed set point (represented at line 63a) and the gear position of the clutch 54 and/or shift rod 23 (represented at line 64a) are a result of the changing operator demand. As the operator demand quickly decreases to the idle set point (represented at line 65) the speed command 13 (line 63a) outputted from the control module 4 to the ECM 10 decreases equally. The change in operator demand is accompanied by gear shift commands, first to shift from forward to reverse, then from reverse to neutral. The change in gear commands from forward to reverse happens relatively quickly (e.g. within one second, or faster), and in the depicted example occurs in about 200 ms. The operator demand 12 quickly increases again, demanding to full throttle reverse.

In the depicted embodiment, the speed command (line 63a) is latched to delay the sudden increase in engine speed in order to ease the transition in an attempt (though unsuccessful) to avoid stalling the engine. A slight shift delay is also implemented, which slightly delays the shift from neutral into reverse gear, which allows the engine to slow down a little and can reduce engine clunk and wear on components of the shift system. However, the rapid change in operator demand is too much, and the engine ultimately stalls. In normal operation (a non-panic situation), the shift and speed set point delays are beneficial to reduce engine clunk and wear on the components of the shift system. However, in a panic situation, the delays are insufficient to avoid engine stall. Furthermore, the inventors recognized that increasing the delays enough to avoid stall is not a desirable strategy because such a system is not sufficiently reactive to the user input and could be dangerous in the event of an urgent need to slow the marine vessel 1 as quickly as possible. Delaying shift can unnecessarily create problems and/or a dangerous situation, such as when operating in tight quarters (like docking near other boats).

Turning to FIG. 4, the disclosed control strategies are implemented to, set minimum speed demand value 14 for the speed command (line 63b) to effectively prevent the marine engine 30 from stalling. In the example, the panic shift command is detected at point 67, at which point the minimum speed demand value 14 is calculated. As described above, the minimum speed demand value 14 sets a minimum for the speed command 13 to the engine system 11. The speed command 13 (line 63b) is maintained at or above the minimum speed demand value 14 for at least the hold period 70 following detection of the panic shift command at point 67. Thus, as the operator demand (line 61b) decreases, shifts into neutral, and then into full throttle reverse, the clutch 54 shifts position accordingly (perhaps with some built-in delay as depicted by line 64b). The shift to reverse occurs at about 1000 RPM. Importantly, the speed command (line 63b) does not go below the minimum speed demand value 14. Accordingly, the engine speed remains well above idle throughout the execution of the control strategy, with the low point of the engine speed (line 62b) falling just below the minimum speed demand value before responding to the speed command to increase the engine speed. As exemplified in FIG. 4, the strategy is sufficient to prevent the engine from stalling.

In various embodiments, the minimum speed demand value 14 and hold period 70 may vary depending on the starting engine RPM of the marine engine 30 at (or approximately at) the detection point 67. In the depicted embodiment, the hold period 70 is approximately 400 milliseconds and the minimum speed demand value 14 is approximately 875 RPM, or 225 RPM offset above the idle set point (which is 650 RPM in the depicted example). In an exemplary embodiment, the hold period 70 varies from 250 milliseconds for lower RPM (starting engine speeds closer to the idle set point) up to 1,250 milliseconds for very high engine RPM (e.g., starting engine speeds close to the maximum engine RPM).

The minimum speed demand value 14 may also vary based on the starting engine speed at the detection point 67—e.g., the minimum speed demand value 14 may be anywhere from the idle speed set point (for starting engine speeds close to idle) up to 250 RPM offset above the idle set point for instances where the starting RPM at the detection point 67 is high. In certain embodiments, the minimum speed demand value may be even further above the idle set point; however, the higher the minimum speed demand value, the harsher the shift will be on the shift system and the more potential damage could be caused by the shift. For example, shifting the clutch 54 to reverse gear at engine speeds well above 250 RPM above idle risks damaging the drive shaft 29, and such risks should be weighed when determining the minimum speed demand value.

In certain embodiments, the speed command 13 from the control module 4 to the engine system 11 may be set immediately to the minimum speed demand value 14 upon detection of the panic shift command. In other embodiments, such as that illustrated in FIG. 4, the speed command (line 63b) may track the operator demand (line 61b) until the operator demand reaches the minimum speed demand value 14, at which point the speed command remains at the minimum speed demand value for the remainder of the hold period 70, regardless of the operator demand. Once the hold period 70 expires, the speed command 13 from the control module 4 to the marine engine system 11 may immediately rise to the current operator demand value.

FIGS. 5-9 depict embodiments of methods 80, or portions thereof, for controlling a marine engine system 11 according to the present disclosure. As will be generally understood by a person having ordinary skill in the art, the method steps represented at FIGS. 5-8 may be carried out by executing control software instructions stored in memory 57 on the processor 56. As will be generally understood, the methods described herein may be implemented with one or more computer programs executed by one or more processors, and several processors may operate as part of a single control module. The computer programs include processor-executable instructions that are stored on a memory 57 comprised of a non-transitory tangible computer readable medium. The computer programs may also include stored data, such as data in the form of lookup tables. As used herein, the term module may refer to or include an application-specific integrated circuit (ASIC), an electronic circuit, a combinational logic circuit, a field programmable gate array (FPGA), a processor (shared, dedicated, or group) that executes stored code as described herein, or other suitable components that provide the described functionality. The term code, as used herein, may include software, firmware, and/or microcode, and may refer to programs, routines, functions, classes, and/or objects.

Figure 5:
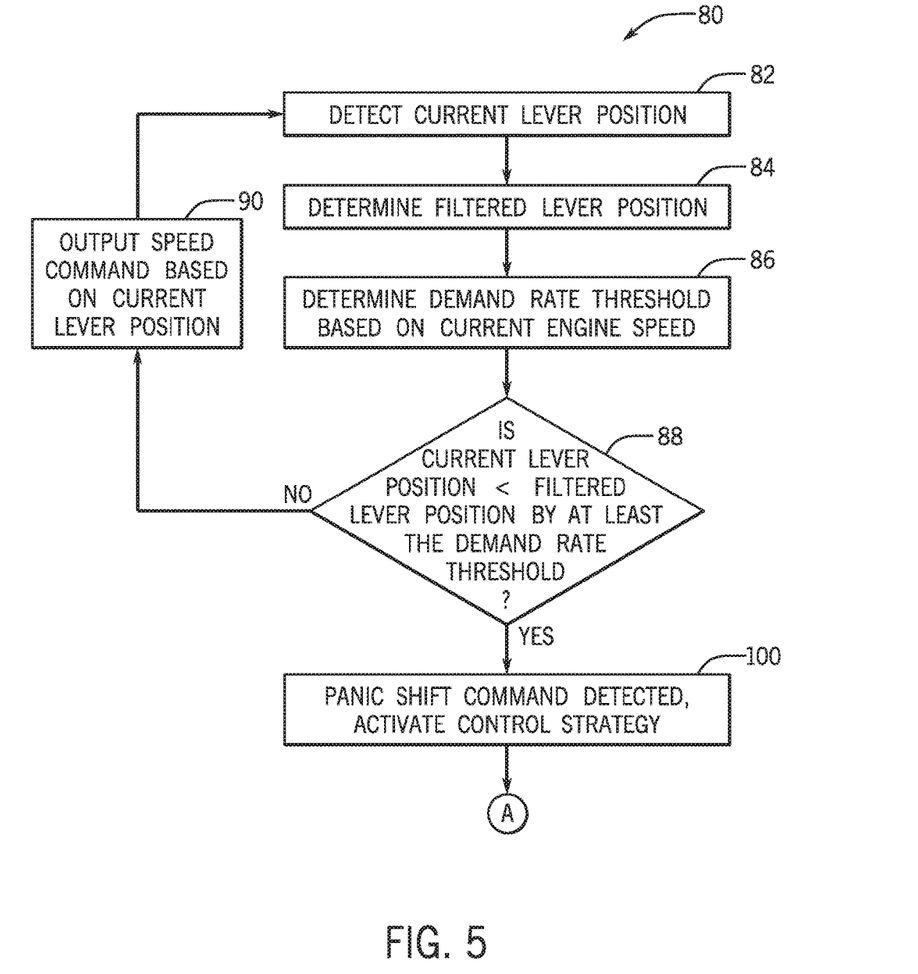
FIGS. 5-8 are flowcharts depicting embodiments of a methods, or portions thereof, of controlling a marine drive.
Figure 6:
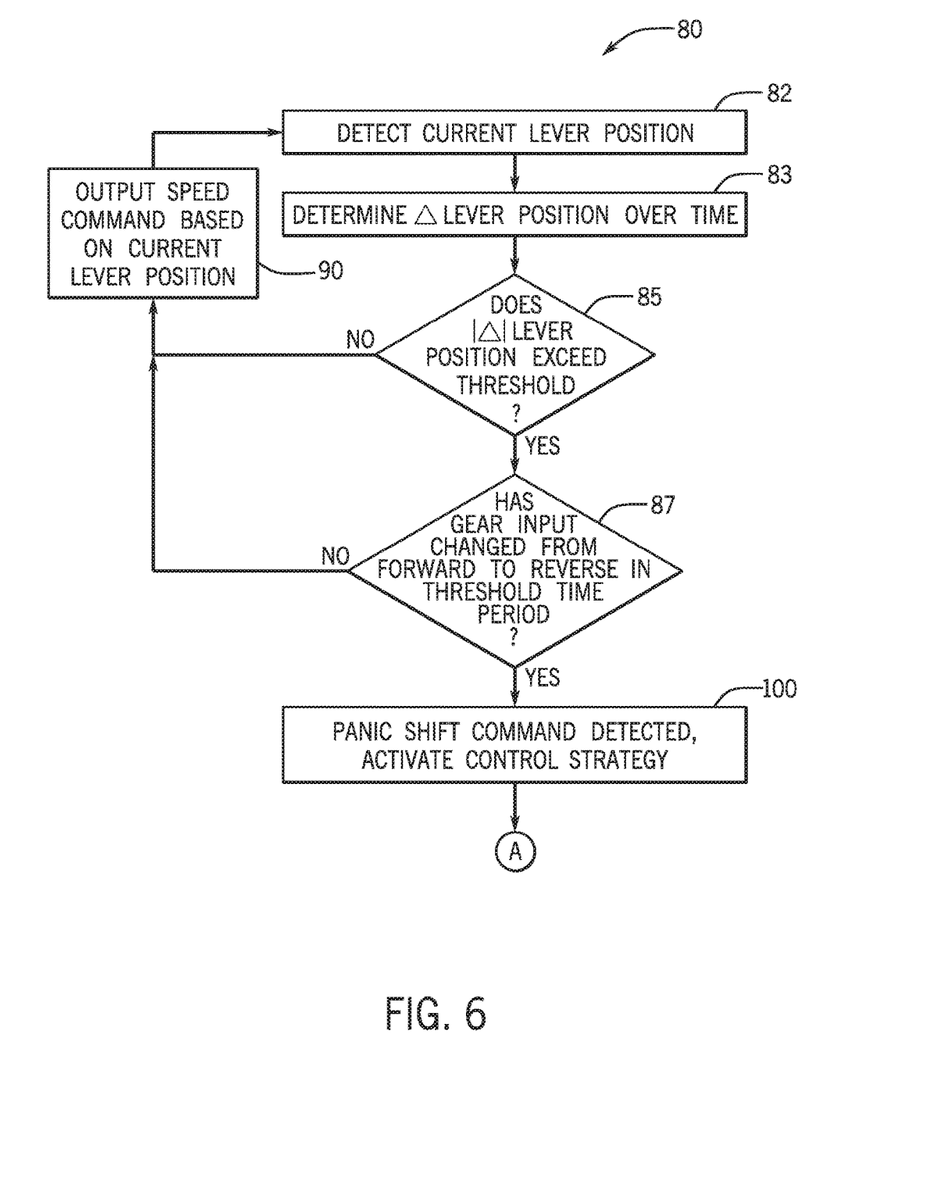

FIGS. 5-6 depict exemplary steps for detecting a panic shift command based on the operator demand 12, which in the depicted embodiment is provided by the lever 33 position sensed by the lever position sensor 46. In the embodiment to FIG. 5, the current lever position is detected at step 82. A filtered lever position is determined at step 84 based on the current lever position and previously-detected lever positions. For example, the filtered lever position may be determined by a first order low pass filter of sufficient length such that the addition of the current lever position minimally effects the filtered lever position.

A demand rate threshold may be determined at step 86 to set a threshold for comparing the current lever position to the filtered lever position for determination of whether a panic shift command has been detected. For example, the demand rate threshold may be determined based on a lookup table of demand rate threshold values ordinated based on engine speed of the marine engine 30. Thereby, the panic shift command detection may be sensitive to starting engine speed such that the control strategy will not be activated unnecessarily, such as when the current engine speed is low and/or if the change in lever position is not sufficient to indicate risking engine stall.

In other embodiments, step 86 may be eliminated and the demand rate threshold may be a pre-set value not dependent on engine speed. Step 88 is then executed to compare the current lever position to the filtered lever position. If the current lever position is less than the filtered lever position by at least the demand rate threshold, then a panic shift command is detected and the control strategy is active accordingly at step 100. Because the filtered lever position lags the current lever position, the difference of the two signals is indicative of how fast the operator demand 12 is changing. If the current lever position is not less than the filtered lever position by at the lease the demand rate threshold at step 88, then the normal operation continues at step 90 where the output speed command 13 from the control module 4 to the marine engine system 11 is based on the operator demand 12, such as the current lever positon.

FIG. 6 depicts a different embodiment of the panic shift command detection. The current demand lever position is detected at step 82. A change in lever position over time is then determined at step 83. For example, a predetermined number of lever positions may be stored from which a rate of change of the lever position may be calculated for the period of time represented by the lever position values. For instance, the rate of change may be calculated by determining a difference between the current lever position and given previous lever position, and then dividing by the time interval between the recording of the two values to determine whether it exceeds a threshold. For example, instructions may be executed to determine whether an absolute value of the change in lever position exceeds a threshold. If not, then normal operation of the speed command based on the current lever position is executed at step 90. If the threshold is exceeded, then instructions may be executed at step 87 to determine whether a gear command has changed from a forward gear command input to a reverse gear command input in a threshold time period indicating that a panic shift command has been given by the user. Assuming that the gear command from the shift control lever has changed from a forward to a reverse gear in the threshold time period, then the panic shift command is detected and the disclosed control strategy is activated at step 100.

In other embodiments, the change in lever position may be assessed to determine whether a negative change in lever position is less than a negative threshold—i.e. that the control lever 33 is in a forward a position and is being pulled back toward neutral at least a threshold rate. In such an embodiment, the control strategy may eliminate step 87 where the gear command is assessed.

In such embodiments where the control module 4 detects the panic shift command based, at least in part, on whether a shift to reverse gear has been commanded by the user, the shift position of the shift system must be provided. In embodiments where the shift is electronically controlled, the shift command, or instruction, may be communicated directly or indirectly to the control module 4. As shown in FIG. 1 and described above, the throttle command to the marine engine 30 is digitally provided and controlled via ECM 10, which controls the position of the throttle valve 28 of the marine engine 30 based on the speed command 13 from the control module 4. Such wireless throttle control systems are known in the art, an example of which is disclosed at U.S. Pat. No. 9,103,287 which has been incorporated herein by reference. In various embodiments of such drive-by-wire systems, the shift control for the shift system may be also digitally controlled where in the shift command is electronically provided to an actuator moving the shift rod 23. In such embodiments, the shift may be delayed as shown in FIGS. 3 and 4.

In other embodiments, a mechanical shift link 21 may actuate the shift. For example, the control lever 33 may be operably connected to a shift linkage 20, such that pivoting the control lever 33 forward or back causes corresponding movement of the shift linkage 20. Portions 20a of the shift linkage 20 are located at the remote control 8, and other portions 20b of the shift linkage 20 are located at or near the marine engine 30 to connect to the shift rod 23. A shift link 21 connects between the shift linkage portions 20a and 20b to translate movement therebetween, and ultimately to translate movement of the control lever 33 to the shift rod 23. For example, the shift link 21 may be a galvanized steel cable, a linkage, or a similar connecting device or element. In such an embodiment where a mechanical link(s) is provided between the shift rod 23 and the remote control 18, the shift is effectuated immediately upon the user's corresponding movement of the control lever 33.

In the depicted embodiment, the remote control 8 controls both the gear position of the gear system (via a gear command signal) and the engine speed (via an operator demand signal). In other embodiments, the throttle and shift controls may be separated into different remote control elements, and a person having ordinary skill in the art will understand in view of this disclosure that the disclosed control strategy may be implemented with equal effect in such a system.

In certain embodiments, the position of the shift rod 23 and/or the shift linkage 20 may be sensed by a shift position sensor 48, based upon which the position of the clutch 54 can be determined. In this example, the shift sensor 48 may be a potentiometer and an electronic converter, such as an analog-to-digital converter that outputs discrete counts that each represent a position of the shift linkage 20. Other embodiments of shift position sensors 48 are known and available. In such an embodiment, the position value representing the position of the shift linkage 20 may be provided from the shift position sensor 48 to the control module 4.

Figure 7:
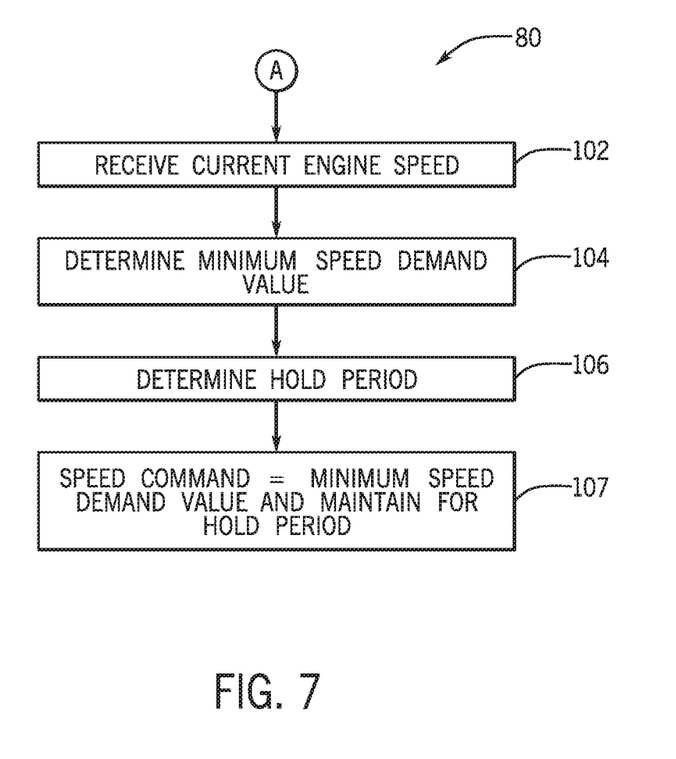

FIGS. 7 and 8 depict exemplary embodiments of method steps for determining the minimum speed demand value and hold period, and setting the speed command accordingly. In the embodiment of FIG. 7, a current engine speed is received at step 102, such as from the ECM 10 the marine engine system 11. The minimum speed demand value 14 is determined at step 104 and the hold period is determined at step 106. In one embodiment, the minimum speed demand value 14 and the hold period are determined based on the current engine speed by accessing a look up table containing minimum speed demand value 14s and hold periods ordinated based on engine speed. Varying the minimum speed demand value 14 based on engine speed helps reduce the visibility of the feature to a user at lower engine speeds, while increasing the effectiveness of the stall prevention at higher engine speeds, where the risk of stall during a panic shift event is greater. Similarly, varying the hold period 70 based on engine speed allows for longer hold times of the minimum speed demand value 14 at high starting engine RPMs, which greatly increases the chances of preventing the engine from stalling and thus increases the robustness of the protection strategy. In certain embodiments, one of the hold period 70 or the minimum speed demand value 14 may be predetermined fixed values, and the other value may be varied accordingly. For example, the hold period 70 may be a predetermined fixed value, such as 0.5 seconds, 1 second, 1.5 seconds, or similar. In still other embodiments, both the hold period 70 and the minimum speed demand value 14 may be predetermined fixed values. Once the minimum speed demand value 14 and hold period are determined, the speed command 13 sent from the control module 4 to the marine engine system 11 is set accordingly at step 107, and the speed command is maintained at the minimum speed demand value 14 for the hold period.

Figure 8:
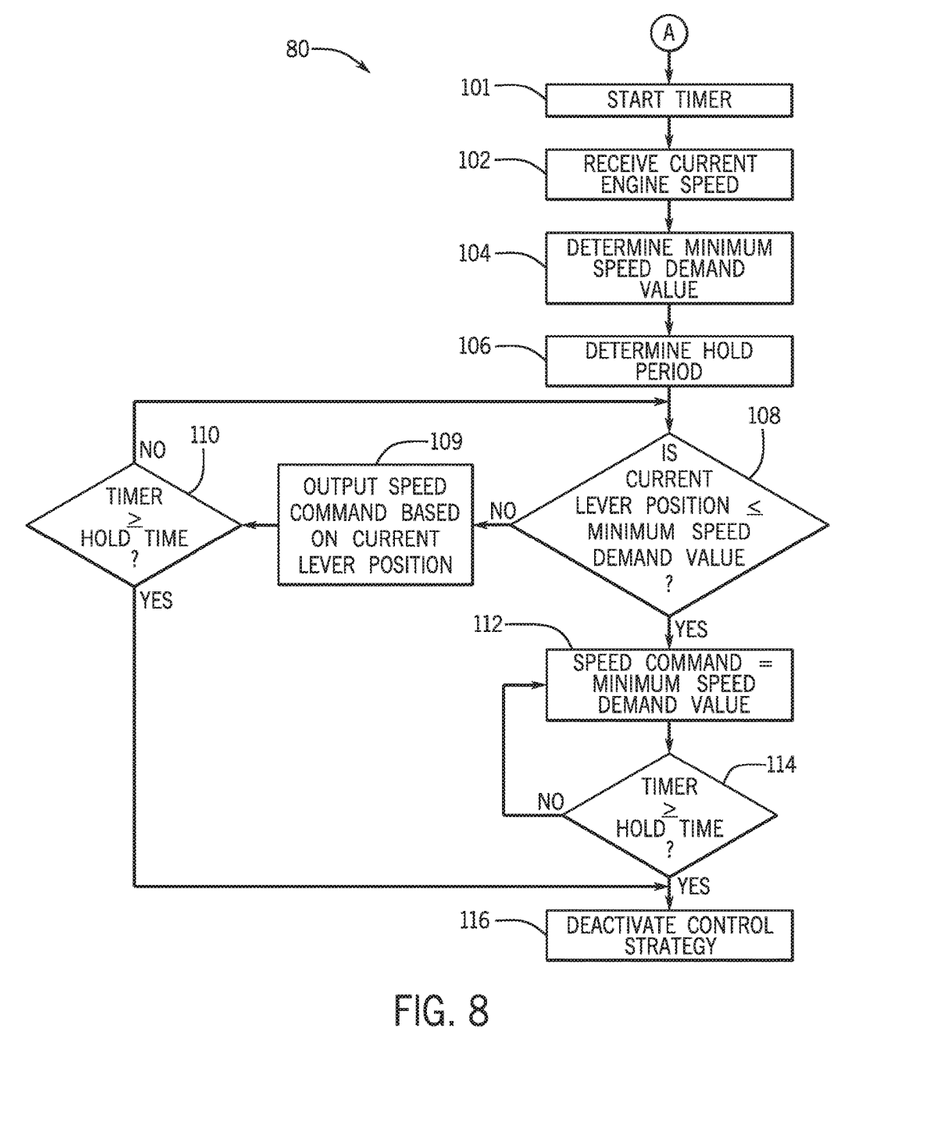

FIG. 8 depicts another embodiment of a method 80 for controlling a marine engine system 11 after detecting a panic shift command. Upon detection of the panic shift command, a timer is started at step 101 and the current engine speed is received at step 102. The minimum speed demand value is determined at step 104 and the hold period is determined at step 106, as is described above. Instructions are executed at step 108 to determine whether the current lever position is less than or equal to the minimum speed demand value 14—i.e., whether the operator demand 12 correlates to an engine speed that is less than or equal to the minimum speed demand value 14 determined at step 104. If not, then the speed command 13 provided by the control module 4 continues to be based on the current lever position according to normal operation, which is represented at step 109. Step 110 is executed to determine whether the timer is greater than or equal to the hold time. If not, then the current lever position continues to be assessed to determine whether the operator demand 12 is below the minimum speed demand value 14. If, at step 110, the timer has reached the hold, then the control strategy is deactivated at step 116. Such a scenario could occur where, for example, the lever is at the wide open throttle forward position 44b and is quickly pulled back to a lever position that this just above the minimum speed demand value 14, such that the threshold change in lever position is exceeded but a full panic shift has not occurred. Accordingly, execution of step 108 avoids decreasing the speed command 13 to an engine speed that is lower than the operator demand 12.

Once the current lever position is less than or equal to the minimum speed demand value 14 calculated at step 104, then the speed command is set to the minimum speed demand value 14 at step 112 and is held there until the time reaches the hold time at step 114. Thereby, the speed command 13 provided by the control module 4 is maintained at the minimum speed demand value 14 for the remainder of the hold period once the current lever position passes the minimum speed demand value 14. Once the hold time expires, then the control strategy is deactivated at step 116 and normal control of the speed command based on the current lever position is resumed.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims.

The invention claimed is:

1. A method for controlling a marine engine system, the method comprising:
    receiving an operator demand to change an engine speed of the marine engine system;
    detecting a panic shift command based on the operator demand;
    determining a minimum speed demand value, wherein the minimum speed demand value is a minimum setpoint for the engine speed;
    determining a hold period for the minimum speed demand value; and
    setting a speed command to the marine engine system at or above the minimum speed demand value for at least the hold period following detection of the panic shift command.

2. The method of claim 1, further comprising, upon detection of the panic shift command, determining a current engine speed and then determining the minimum speed demand value and the hold period based on the current engine speed.

3. The method of claim 1, further comprising, upon detection of the panic shift command, determining a current engine speed and then determining the minimum speed demand value based on the current engine speed.

4. The method of claim 3, wherein the step of determining the minimum speed demand value includes accessing a lookup table containing minimum speed demand values ordinated based on engine speed.

5. The method of claim 4, wherein the minimum speed demand values are offset amounts above an idle setpoint for the engine.

6. The method of claim 3, wherein the hold period is a predetermined fixed value.

7. The method of claim 1, wherein the speed command is set at the minimum speed demand value upon detecting the panic shift command and is maintained at the minimum speed demand value for the hold period.

8. The method of claim 1, wherein the step of setting the speed command includes setting the speed command based on the operator demand until the operator demand decreases below the minimum speed demand value, and then maintaining the speed command at the minimum speed demand value for a remainder of the hold period.

9. The method of claim 1, further comprising:
sensing a lever position over time of a remote control, wherein the operator demand is based on the lever position; and
wherein the panic shift command is detected based on the lever position over time.

10. The method of claim 9, further comprising:
determining a filtered lever position based on the lever position over time;
wherein the step of detecting the panic shift command includes determining that a most recent lever position is less than the filtered lever position by more than a demand rate threshold amount.

11. The method of claim 10, further comprising determining the demand rate threshold amount based on a current engine speed.

12. The method of claim 1, further comprising:
receiving gear command to control a gear position of the marine engine system; and
determining that the gear command changes from a forward gear command to a reverse gear command within a threshold time period prior to maintaining the speed command at or above the minimum speed demand value for the hold period.

13. A marine propulsion system comprising:
a marine engine system;
a remote control for controlling propulsion of a marine vessel by the marine engine system;
a control module configured to:
receive an operator demand based on a lever position of the remote control to change an engine speed of the marine engine system;
detect a panic shift command based on the operator demand;
determine a minimum speed demand value, wherein the minimum speed demand value is a minimum setpoint for the engine speed;
determine a hold period for the minimum speed demand value; and
setting a speed command to the marine engine system at or above the minimum speed demand value for at least the hold period following detection of the panic shift command.

14. The system of claim 13, wherein the control module is further configured to, upon detection of the panic shift command, determine a current engine speed and then determine the minimum speed demand value and the hold period based on the current engine speed.

15. The system of claim 13, wherein the control module is further configured to, upon detection of the panic shift command, determine a current engine speed and then determine the minimum speed demand value based on the current engine speed.

16. The system of claim 15, wherein the minimum speed demand value is determined by accessing a lookup table containing minimum speed demand values ordinated based on engine speed.

17. The system of claim 16, wherein the minimum speed demand values in the lookup table are offset amounts above an idle setpoint for the engine.

18. The system of claim 13, wherein the control module is further configured to, upon detection of the panic shift command, determine a current engine speed and then determine the hold period based on the current engine speed.

19. The system of claim 13, wherein the control module is further configured to sense the lever position over time and determine a filtered lever position based on the lever position over time, wherein the step of detecting the panic shift command includes determining that a most recent lever position is less than the filtered lever position by more than a demand rate threshold amount.

20. The system of claim 19, wherein the control module is further configured to determine the demand rate threshold amount based on a current engine speed.

\* \* \* \* \*